United States Patent Office 3,565,977
Patented Feb. 23, 1971

3,565,977
CYCLOPENTENE ESTERS OF
PHOSPHORAMIDIC ACIDS
Rudi F. W. Rätz, deceased, late of Hamden, Conn., by Margot I. H. Rätz, executrix, Hamden, Conn., and Miriam J. Gruber, Dover, N.J., assignors, by mesne assignments, to The Ansul Company, a corporation of Wisconsin
No Drawing. Filed Apr. 8, 1968, Ser. No. 719,779
Int. Cl. A01n 9/36; C07f 9/24
U.S. Cl. 260—941                                15 Claims

ABSTRACT OF THE DISCLOSURE

Compounds having the formula

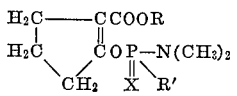

wherein X is oxygen or sulfur, R' is OR or $NR_2$ and each R is an independently selected alkyl are provided by reacting alkali metal salts of carbalkoxycyclopentanones with substituted phosphoramidochloridates and -diamidochloridates. These compounds are useful agricultural chemicals; for example, they are particularly valuable insecticides and herbicides.

---

This invention relates to a series of substituted cyclopentene esters, and more particularly to phosphorus and nitrogen containing substituted cyclopentene esters having the formula:

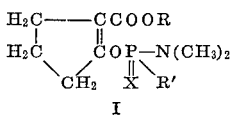

wherein X is oxygen or sulfur, R' is OR or $NR_2$ and each R is an independently selected alkyl moiety.

The compounds I of this invention are provided by reacting an alkali metal salt of a carbalkoxycyclopentanone with substituted phosphoramidochloridates and -diamidochloridates in accordance with the following equation wherein M is alkali metal and R, R' and X are as previously described.

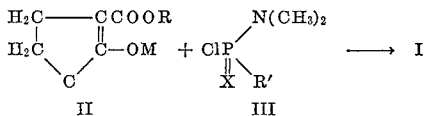

While any alkali metal salt of a carbalkoxycyclopentanone II and any substituted phosphoramidochloridate and -diamidochloridate III can be employed in the preparation of compounds I, preferred embodiments employ those starting reactants wherein R is lower alkyl, i.e., alkyl having 1–5 carbon atoms.

Exemplificative preferred alkali metal salts of carbalkoxycyclopentanones II include sodium 2-methoxycarbonyl cyclopentenolate, sodium 2 - ethoxycarbonyl cyclopentenolate, sodium 2-n-propoxycarbonyl cyclopentenolate, sodium 2-n-butoxycarbonyl cyclopentenolate, sodium 2-n-pentoxycarbonyl cyclopentenolate and potassium 2-methoxycarbonyl cyclopentenolate.

Illustrative preferred substituted phosphoramidochloridates and -diamidochloridates II which are employed in the preparation of compounds I include O-methyl-N,N-dimethylphosphoramidochloridate,
O-ethyl-N,N-dimethylphosphoramidochloridate;
O-n-propyl-N,N-dimethylphosphoramidochloridate;
O-isobutyl-N,N-dimethylphosphoramidochloridate;
O-isopentyl-N,N-dimethylphosphoramidochloridate;
O-ethyl-N,N-dimethylthiophosphoramidochloridate;
O-n-butyl-N,N-dimethylphosphoramidochloridate;
O-n-pentyl-N,N-dimethylphosphoramidochloridate;
N,N,N',N'-tetramethylphosphordiamidochloridate;
N,N-dimethyl-N',N'-diethylphosphordiamidochloridate and
N,N-dimethyl-N'-ethyl-N'-n-propylphosphordiamidochloridate.

The substituted cyclopentene esters I are readily prepared by reacting an alkali metal salt of a carbalkoxycyclopentanone II with a substituted phosphoramidochloridate or -diamidochloridate III, preferably in the presence of an anhydrous solvent. Suitable solvents include benzene, toluene, xylene, dimethyl acetamide, etc. While the reaction proceeds over a wide temperature range, it is preferably conducted at the reflux temperature of the particular solvent employed.

The desired substituted cyclopentene esters I are obtained in high yield and excellent purity and are readily isolated from the reaction mixture by conventional techniques such as filtration, distillation and the like.

The compounds I of this invention have a wide variety of useful applications and are particularly valuable agricultural chemicals. Thus, they exhibit strong pesticidal activity as insecticides, herbicides, etc. Generally, they are mixed with various adjuvants in these applications, and low concentrations of the compound are extremely effective.

For example, they are excellent contact insecticides for such insects as the Mexican bean beetle and the boll weevil. Thus, N,N - dimethylphosphoramidic acid, O(2-methoxycarbonyl-1-cyclopenten - 1 - yl)O-methyl ester; N,N-dimethylphosphoramidothioic acid, O(2 - ethoxycarbonyl-1-cyclopentenyl)O-ethyl ester and N,N,N'N'-tetramethylphosphordiamidic acid, O(2-ethoxycarbonyl - 1-cyclopenten-1-yl) ester were very effective in killing these insects when applied in insecticidal formulations containing .1 percent by weight of the insecticide.

The compounds I of this invention are also valuable pre-emergence herbicides. For example, N,N - dimethylphosphoramidothioic acid, O - ethyl - O(2-methoxycarbonyl-1-cyclopentenyl) ester was extremely effective in controlling crabgrass, mustard and pigweed.

The post-emergence herbicidal effectiveness of compounds I is illustrated by the control of pigweed by N,N-dimethylphosphoramidic acid, O(2 - propoxycarbonyl-1-cyclopentenyl)O-ethyl ester and N,N-dimethylphosphoramidic acid, O(2-butoxycarbonyl-1-cyclopentenyl)O-ethyl ester at a rate of application of 20 pounds per acre.

The following examples are presented to illustrate the preparation of various substituted cyclopentene esters I in accordance with the practice of this invention.

EXAMPLE 1

To a slurry of 12.3 g. (0.075 mole) of sodium 2-methoxycarbonyl cyclopentenolate in about 200 ml. of benzene from which residual moisture had been removed by azeotropic distillation was added dropwise, with stirring, a solution of 11.8 g. (0.075 mole) of O-methyl-N,N-dimethylphosphoramidochloridate in about 100 ml. of benzene. The mixture became opalescent and paler yellow in color during addition. It was then refluxed for five hours, cooled and filtered to remove the formed sodium chloride. The benzene filtrate was extracted twice with 5% sodium carbonate solution and then three times with water. Then the benzene extract was dried over sodium sulfate and clarified by means of fuller's earth. After filtration, the solvent was removed from the benzene extract by rotary evaporation at reduced pressure. The residue was kept at 50–55° C./0.1 mm. Hg for forty-five minutes and then distilled under vacuum to provide an oily product, B.P. 127–31° C./0.6 mm. Hg; $n_D^{20}$ 1.4775. The following analytical data revealed that N,N-dimethylphosphoramidic acid, O(2 - methoxycarbonyl - 1 - cyclopenten-1-yl)O-methyl ester had been obtained.

*Analysis.*—Calcd. for $C_{10}H_{18}NO_5P$ (percent): C, 45.63; H, 6.89; P, 11.77. Found (percent): C, 45.44; H, 6.69; P, 10.55.

EXAMPLE 2

Following the procedure of Example 1, a slurry of 9.0 g. (0.055 mole) of sodium 2-methoxycarbonyl cyclopentenolate in about 150 ml. of benzene from which residual moisture had been removed by azeotropic distillation was added to a solution of 9.4 g. of O-ethyl-N,N-dimethylphosphoramidochloridate in 80 ml. of benzene. The mixture was refluxed for 4½ hours during which it became opalescent in appearance. After cooling, the reaction mixture was filtered to remove the formed sodium chloride. The benzene filtrate was extracted once with water and then twice with 5% sodium carbonate solution and again with water. The extract was dried over sodium sulfate and clarified by means of fuller's earth. After filtration, the benzene was removed by rotary evaporation at reduced pressure. The residue was maintained at 60–70° C./0.1 mm. Hg for about thirty minutes, thereby providing 10.2 g. of a pale yellow oil. Vacuum distillation yielded a pure oil, B.P. 121–24° C./0.5 mm. Hg; $n_D^{20}$ 1.4746. The following analytical data revealed that N,N-dimethylphosphoramidic acid, O-ethyl-O(2-methoxycarbonyl-1-cyclopenten-1-yl) ester had been obtained.

*Analysis.*—Calcd. for $C_{11}H_{20}NO_5P$ (percent): C, 47.65; H, 7.27; P, 11.17. Found (percent): C, 47.05; H, 7.23; P, 10.88.

EXAMPLE 3

To a slurry of 13.4 g. (0.075 mole) of sodium 2-ethoxycarbonyl cyclopentenolate in about 200 ml. of benzene from which residual moisture had been removed by azeotropic distillation was added dropwise, with stirring, a solution of 11.8 g. (0.075 mole) of O-methyl-N,N-dimethylphosphoramidochloridate in about 100 ml. of benzene. The mixture was then refluxed with stirring for 4½ hours. After cooling, the reaction mixture was filtered to remove the formed sodium chloride, which was triturated with ether, refiltered and dried. The ether was removed from the salt by rotary evaporation at reduced pressure, thereby providing 0.2 g. of residual pale yellow oil which was added to the benzene filtrate. The filtrate was then extracted twice with 5% aqueous sodium carbonate solution and three times with water. Then the benzene extract was dried over sodium sulfate, clarified with fuller's earth and filtered. After solvent removal by rotary evaporation at reduced pressure, the residual oil was maintained at 55–60° C./0.1 mm. Hg for 30 minutes to obtain 15.4 g. of a brown oil. Vacuum distillation provided a pure oil, B.P. 132–37° C./0.8 mm. Hg; $n_D^{20}$ 1.4759. The following analytical data revealed that N,N-dimethylphosphoramidic acid, O(2 - ethoxycarbonyl - 1 - cyclopentenyl)O-methyl ester had been obtained.

*Analysis.*—Calcd. for $C_{11}H_{20}NO_5P$ (percent): C, 47.65; H, 7.27; P, 11.17. Found (percent): C, 47.92; H, 7.17; P, 10.41.

EXAMPLE 4

Following the procedure of Example 3, 9.8 g. (0.055 mole) sodium 2-ethoxycarbonyl cyclopentenolate in about 150 ml. of benzene from which residual moisture had been removed by azetotropic distillation was reacted with 9.4 g. (0.055 mole) of O-ethyl-N,N-dimethylphosphoramidochloridate in 80 ml. of benzene. The resulting crude product was maintained at 60–70° C./0.1 mm. Hg for 45 minutes, thereby obtaining 12.7 g. of a yellow oil. Vacuum distillation provided a pure oil, B.P. 141–47° C./0.45 mm. Hg; $n_D^{20}$ 1.4736. The following analytical data revealed that N,N-dimethylphosphoramidic acid, O(2-ethoxycarbonyl-1-cyclopenten-1-yl)O-ethyl ester had been obtained.

*Analysis.*—Calcd. for $C_{12}H_{22}NO_5P$ (percent): C, 49.48; H, 7.61; P, 10.63. Found (percent): C, 49.49; H, 7.65; P, 10.19.

EXAMPLE 5

To a slurry of 8.5 g. (0.05 mole) of sodium 2-propoxycarbonyl cyclopentenolate in about 100 ml. of benzene from which residual moisture had been removed by azeotropic distillation was added dropwise with stirring a solution of 8.6 g. (0.05 mole) of O-ethyl-N,N-dimethylphosphoramidochloridate in about 80 ml. benzene. The mixture was refluxed with stirring for five hours and then filtered to separate the formed sodium chloride. Then the benzene filtrate was extracted once with water, twice with 5% sodium bicarbonate solution and again twice with water. The extract was dried over sodium sulfate and clarified with fuller's earth. After filtration, the solvent was removed by rotary evaporation at reduced pressure. The residue was maintained at 70° C./0.1 mm. Hg for 30 minutes, thereby providing 11.9 g. of pale yellow oil. Vacuum distillation provided a pure oil, B.P. 142–43° C./0.1 mm. Hg; $n_D^{20}$ 1.4712. The following analytical data revealed that N,N-dimethylphosphoramidic acid, O(2-propoxycarbonyl-1-cyclopentenyl)O-ethyl ester had been obtained.

*Analysis.*—Calcd. for $C_{13}H_{24}NO_5P$ (percent): C, 51.14; H, 7.92; P, 10.15. Found (percent): C, 49.58; H, 7.78; P, 10.65.

EXAMPLE 6

Following the procedure of Example 5, 7.7 g. (0.04 mole) of sodium 2-isopropoxycarbonyl cyclopentenolate in about 90 ml. of benzene from which residual moisture had been removed by azeotropic distillation was reacted with 6.9 g. (0.04 mole) of O-ethyl-N,N-dimethylphosphoramidochloridate in 90 ml. of benzene. The residual oil was maintained at 60–70° C./0.1 mm. Hg for about 40 minutes, thereby obtaining 9.4 g. of oily product. Vacuum distillation provide a pure oil, B.P. 137–42° C./0.5 mm. Hg; $n_D^{20}$ 1.4703. The following analytical data revealed that N,N-dimethylphosphoramidic acid, O(2-isopropoxycarbonyl-1-cyclopentenyl)O - ethyl ester had been obtained.

*Analysis.*—Calcd. for $C_{13}H_{24}NO_5P$ (pecrent): C, 51.14; H, 7.92; P, 10.15. Found (percent): C, 50.30; H, 7.93; P, 10.40.

EXAMPLE 7

Following the procedure of Example 5, 8.3 g. (0.04 mole) of sodium 2-butoxycarbonyl cyclopentenolate in about 100 ml. of dried benzene was reacted with 6.9 g. (0.04 mole) of O-ethyl-N-dimethylphosphoramidochloridate in about 100 ml. of benzene to obtain, after evaporation, 11.6 g. of a clear, pale yellow oil, 90.6% yield. Vacuum distillation at 132–36.5° C./ 0.07 mm. Hg provided a pure product; $n_D^{20}$ 1.4725. The following analytical data revealed that N,N-dimethylphosphoramidic acid, O(2-butoxycarbonyl - 1 - cyclopentenyl)O-ethyl ester had obtained.

*Analysis.*—Calcd. for $C_{14}H_2NO_5P$ (percent): C, 52.66; H, 8.21; P, 9.70. Found (percent): C, 52.02; H, 8.22; P, 9.36.

EXAMPLE 8

Following the procedure of Example 5, 10.1 g. (0.05 mole) of sodium 2-isobutoxycarbonyl-1-cyclopentenolate in about 100 ml. of dried benzene was reacted with 8.6 g. (0.05 mole) of O-ethyl-N-dimethylamidophosphorochloridate in 100 ml. of benzene. The residue was maintained at 55–65° C./0.1 mm. Hg for 40 minutes, thereby obtaining 12.6 g. of a clear light yellow liquid. Vacuum distillation provided a pure oil, B.P. 130–37° C./0.04 mm. Hg; $n_D^{23}$ 1.4675. The following analytical data revealed that N,N-dimethylphosphoramidic acid, O(2-isobutoxycarbonyl-1-cyclopentenyl)O-ethyl ester had obtained.

Analysis.—Calcd. for $C_{14}H_{26}NO_5P$ (percent): C, 52.66; H, 8.21; P, 9.70. Found (percent): C, 51.72; H, 8.15; P, 9.71.

EXAMPLE 9

To a warm (90° C.) slurry of 8.2 g. (0.05 mole) of sodium 2-methoxycarbonyl cyclopentenolate in 25 ml. of freshly distilled dimethylacetamide was added 9.5 g. (0.05 mole) O-ethyl-N,N - dimethylthiophosphoramidochloridate mixed with 25 ml. of dimethylacetamide. The reaction mixture initially became quite thick; after stirring for a few minutes it became less viscous and turned to a pale reddish orange. It was heated at about 90° C. for 1½ hours and became light brown in color during this period. After cooling, the reaction mixture was filtered to separate formed sodium chloride. Then the sodium chloride was triturated with a large volume of ether and refiltered. The dimethylacetamide and ether filtrates were combined and extracted twice with water, twice with 5% sodium bicarbonate solution and again twice with water. Most of the dimethylacetamide was removed by the first water extractions. The ether extract was dried over sodium sulfate. After removal of the drying agent the residue was maintained at 70° C./0.1 mm. Hg for 30 minutes, thereby obtaining 4.2 g. of a clear reddish brown oil; $n_D^{20}$ 1.5066. The following analytical data revealed that N,N-dimethylphosphoramidothioic acid, O-ethyl-O (2-methoxycarbonyl-1-cyclopentenyl) ester had been obtained.

Analysis.—Calcd. for $C_{11}H_{20}NO_4PS$ (percent): C, 45.04; H, 6.87; P, 10.56. Found (percent): C, 42.62; H, 6.49; P, 9.04.

EXAMPLE 10

To a warm (100° C.) slurry of 8.9 g. (0.05 mole) of sodium 2-ethoxycarbonyl cyclopentenolate in 25 ml. of freshly distilled dimethylacetamide was added 9.5 g. (0.05 mole) of O-ethyl-N,N-dimethylthiophosphoramidochloridate in 35 ml. dimethylacetamide. The initially bright yellow slurry became light brown in color during the addition. Heating at 85–100° C. with stirring was continued for 2½ hours. After cooling, a large quantity of ether was added to the reaction mixture to precipitate the formed sodium chloride which was separated by filtration. The dimethylacetamide ether mixture was extracted twice with water, twice with 5% sodium bicarbonate solution and again twice with water. Most of the dimethylacetamide was removed by the first water extractions. The ether solution was dried over sodium sulfate. After separation of the drying agent by filtration the ether was removed by rotary evaporation at reduced pressure. The residue was maintained at 70° C./0.1 mm. Hg for 30 minutes, thereby obtaining 8.6 g. of brown oil; $n_D^{20}$ 1.5024. The following analytical data revealed that N,N-dimethylphosphoramidothioic acid, O(2-ethoxycarbonyl-1-cyclopentenyl)O-ethyl ester had been obtained.

Analysis.—Calcd. for $C_{12}H_{22}NO_4PS$ (percent): C, 46.89; H, 7.22; P, 10.08. Found (percent): C, 47.34; H, 7.19; P, 7.62.

EXAMPLE 11

To a slurry of 11.5 g. (0.07 mole) of sodium 2-methoxycarbonyl cyclopentenolate in about 200 ml. of benzene from which residual moisture had been removed by azeotropic distillation was added dropwise, with stirring, a solution of 12.0 g. (0.07 mole) of N,N,N',N'-tetramethylphosphordiamidochloridate in 100 ml. of benzene over a period of forty minutes. The mixture was then refluxed for 4½ hours. After cooling, the reaction mixture was filtered to remove formed sodium chloride, which was washed with ether, filtered and dried. The ether was removed from the filtrate by rotary evaporation at reduced pressure and the residual oil (about 1 g.) was added to the original benzene filtrate. This benzenic solution was extracted once with 5% aqueous sodium carbonate, then twice with water. The benzene layer was dried over sodium sulfate and clarified by means of fuller's earth before filtration. From the filtrate, benzene was removed by rotary evaporation at reduced pressure, thereby obtaining 14.6 g. (75.7% yield) of a yellow oil. The following analytical data revealed that N,N,N',N'-tetramethylphosphordiamidic acid, O(2-methoxycarbonyl-1-cyclopenten-1-yl) ester had been obtained.

Analysis.—Calcd. for $C_{11}H_{21}N_2O_4P$ (percent): C, 47.82; H, 7.66; P, 11.21. Found (percent): C, 47.85; H, 7.53; P, 11.16.

EXAMPLE 12

Following the procedure of Example 11, 12.3 g. (0.07 mole) of sodium 2-ethoxycarbonyl cyclopentenolate in about 200 ml. of dried benzene was reacted with 12.0 g. (0.07 mole) of N,N,N',N'-tetramethylphosphordiamidochloridate in 100 ml. of benzene to obtain 14.7 g. (72.5%) of a light orange colored liquid; $n_D^{20}$ 1.4860. The following analytical data revealed N,N,N',N'-tetramethylphosphordiamidic acid, O(2-ethoxycarbonyl-1-cyclopenten-1-yl) ester had been obtained.

Analysis.—Calcd. for $C_{12}H_{23}N_2O_4P$ (percent): C, 49.65; H, 7.99; P, 10.67. Found (percent): C, 50.83; H, 7.65; P, 9.32.

What is claimed is:

1. A substituted cyclopentene ester having the formula

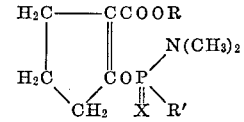

wherein X is oxygen or sulfur, R' is OR or $NR_2$ and each R is an independently selected lower alkyl.

2. The compound of claim 1 having the formula

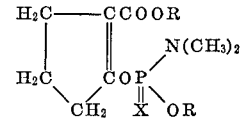

wherein X is oxygen or sulfur and each R is an independently selected lower alkyl.

3. The compound of claim 2 N,N-dimethylphosphoramidic acid, O(2-methoxycarbonyl-1-cyclopenten-1-yl)O-methyl ester.

4. The compound of claim 2 N,N-dimethylphosphoramidic acid, O-ethyl-O(2-methoxycarbonyl-1-cyclopenten-1-yl) ester.

5. The compound of claim 2 N,N-dimethylphosphoramidic acid, O(2-ethoxycarbonyl - 1 - cyclopentenyl)O-methyl ester.

6. The compound of claim 2 N,N-dimethylphosphoramidic acid, O(2-ethoxycarbonyl-1-cyclopenten-1-yl)O-ethyl ester.

7. The compound of claim 2 N,N-dimethylphosphoramidic acid, O(2 - propoxycarbonyl-1-cyclopentenyl)O-ethyl ester.

8. The compound of claim 2 N,N-dimethylphosphoramidic acid, O(2-isopropoxycarbonyl-1-cyclopentenyl)O-ethyl ester.

9. The compound of claim 2 N,N-dimethylphosphoramidic acid, O(2-butoxycarbonyl-1-cyclopentenyl)O-ethyl ester.

10. The compound of claim 2 N,N-dimethylphosphoramidic acid, O(2-isobutoxycarbonyl-1-cyclopentenyl)O-ethyl ester.

11. The compound of claim 2 N,N-dimethylphosphoramidothioic acid, O-ethyl-O(2-methoxycarbonyl-1-cyclopentenyl) ester.

12. The compound of claim 2 N,N-dimethylphosphoramidothioic acid, O(2-ethoxycarbonyl-1-cyclopentenyl)O-ethyl ester.

13. The compound of claim 1 having the formula

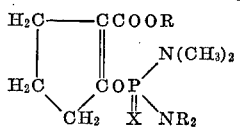

wherein X is oxygen or sulfur and each R is an independently selected lower alkyl.

14. The compound of claim 13 N,N,N',N'-tetramethylphosphordiamidic acid, O(2-methoxycarbonyl-1-cyclopenten-1-yl) ester.

15. The compound of claim 13 N,N,N',N'-tetramethylphosphordiamidic acid, O(2-ethoxycarbonyl-1-cyclopenten-1-yl) ester.

References Cited

UNITED STATES PATENTS 2,788,358  4/1957  Grundmann et al. ____ 260—941

CHARLES B. PARKER, Primary Examiner

A. H. SUTTO, Assistant Examiner

U.S. Cl. X.R.

71—86, 87; 260—973; 424—212

PO-1050
(5/69)

UNITED STATES PATENT OFFICE
CERTIFICATE OF CORRECTION

Patent No. 3,565,977      Dated February 23, 1971

Inventor(s) Rudi F. W. Rätz et al.

It is certified that error appears in the above-identified patent and that said Letters Patent are hereby corrected as shown below:

Col. 3, line 68, "azetotropic" should read --azeotropic--.

Col. 4, line 41, "provide" should read --provided--.

Col. 4, line 60, before "obtained" insert the word --been--.

Col. 4, line 61, "C14H2NO5P" should read --C14H26NO5P--.

Col. 4, line 62, "P, 9.36" should read --P, 9.43 9.36--.

Signed and sealed this 10th day of August 1971.

(SEAL)
Attest:

EDWARD M. FLETCHER, JR.      WILLIAM E. SCHUYLER, JR.
Attesting Officer      Commissioner of Patents